United States Patent [19]

Honma et al.

[11] Patent Number: 4,741,545
[45] Date of Patent: May 3, 1988

[54] FRONT WHEEL STEERING DEVICE FOR MOTOR VEHICLES

[75] Inventors: Kenji Honma; Tsutomu Sakuma, both of Saitama, Japan

[73] Assignee: Honda Giken Kogyo Kabushiki Kaisha, Tokyo, Japan

[21] Appl. No.: 17,785

[22] Filed: Feb. 24, 1987

[30] Foreign Application Priority Data

Feb. 24, 1986 [JP] Japan .................................. 61-38569

[51] Int. Cl.$^4$ ........................................... B62K 11/12
[52] U.S. Cl. ..................................... 280/92; 180/210; 280/276
[58] Field of Search ..................... 280/771, 91, 92, 99; 180/140, 210

[56] References Cited

U.S. PATENT DOCUMENTS

| 3,090,638 | 5/1963 | Somhegyi | 280/92 |
| 4,179,135 | 12/1979 | Slater | 280/276 |
| 4,265,329 | 5/1981 | de Cortanze | 180/219 |
| 4,388,978 | 6/1983 | Fior | 180/219 |
| 4,526,249 | 7/1985 | Parker | 180/219 |
| 4,540,189 | 9/1985 | Tanaka | 280/270 |
| 4,641,849 | 2/1987 | Andre | 280/778 |

FOREIGN PATENT DOCUMENTS 102739 8/1979 Japan .

Primary Examiner—Richard A. Bertsch
Attorney, Agent, or Firm—Irving M. Weiner; Joseph P. Carrier; Pamela S. Burt

[57] ABSTRACT

A front wheel supporting member comprises a steering handle, a member supporting a single front wheel, an arm which supports the front wheel supporting member on a motor vehicle body, and a link assembly by which the steering handle and the front wheel supporting member are angularly movable coupled to each other. The link assembly includes a first universal joint operatively coupled to the steering handle and a second universal joint operatively coupled to the front wheel supporting member. The second universal joint has a center on the axis of angular movement of the front wheel supporting member.

10 Claims, 3 Drawing Sheets

FIG.3
FIG.4
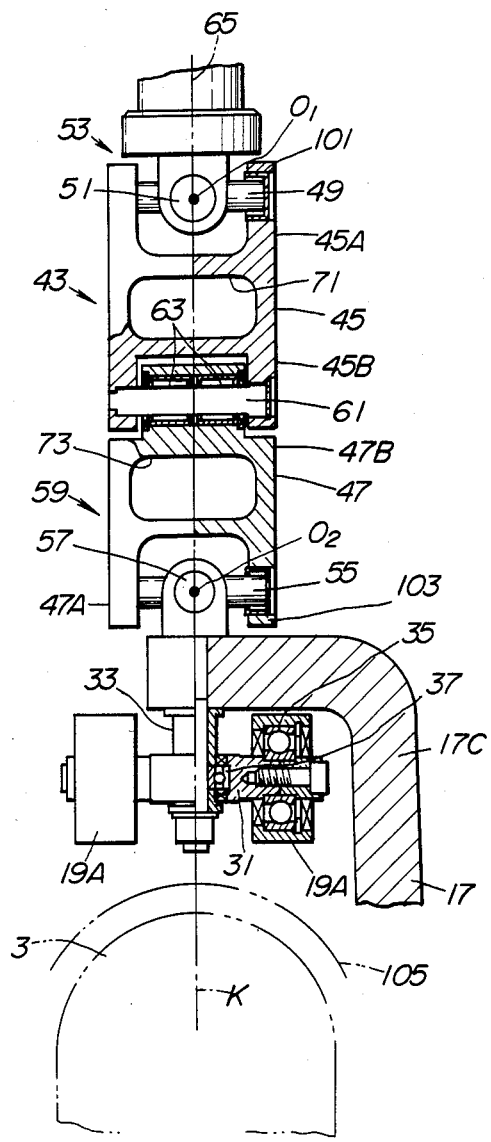
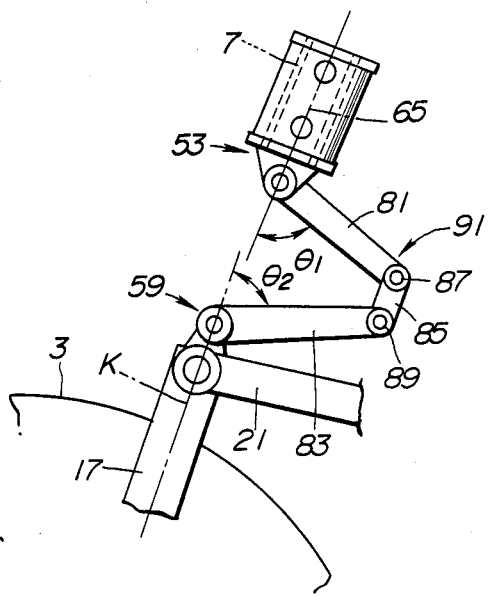

4,741,545

FRONT WHEEL STEERING DEVICE FOR MOTOR VEHICLES

BACKGROUND OF THE INVENTION

1. Field of the Invention:

The present invention relates to a front wheel steering device for a motor vehicle, and more particularly to a steering device of the type in which a steering handle and a single front wheel supporting member are interconnected by a link.

2. Description of the Relevant Art:

There is known a front wheel steering device for a motor vehicle, comprising a steering handle angularly movably mounted on a motor vehicle body, a front fork supported on the motor vehicle body by arms extending forwardly from the motor vehicle body, and a link assembly by which the steering handle and the front fork are coupled to each other. Such a front wheel steering device is disclosed in Japanese Laid-Open Patent Publication No. 54 (1979)-102739, for example. In the known front wheel steering device, the link assembly is constructed of an upper link having one end coupled to the steering handle by a first universal joint and a lower link having one end coupled to the front fork by a second universal joint, the other ends of the upper and lower links being pivotally joined to each other. The second universal joint between th front fork and the lower link is spaced from the axis about which the front fork is angularly movable at the time of steering the front wheel. Accessories such as a headlight disposed near the link assembly are therefore positionally limited to an area that is considerably spaced from the axis of angular movement of the front fork and positioned outside of the path of movement of the second universal joint or the link assembly upon steering motion of the front fork.

SUMMARY OF THE INVENTION

According to the present invention, there is provided a front wheel steering device for a motor vehicle, comprising a motor vehicle body, a steering handle angularly movably mounted on the motor vehicle body, a front wheel supporting member, a single front wheel rotatably supported by the front wheel supporting member, an arm extending forwardly from the motor vehicle body and supporting the front wheel supporting member on the motor vehicle body, and a link assembly by which the steering handle and the front wheel supporting member are angularly movably interconnected, the link assembly including a first universal joint operatively coupled to the steering handle and a second universal joint operatively coupled to the front wheel supporting member, the front wheel supporting member having an axis about which it is angularly movable, the second universal joint having a center on the axis of the front wheel supporting member.

With the above arrangement, the path of movement of the link assembly interconnecting the steering handle and the front wheel supporting member at the time of steering the front wheel is of a reduced radius, and hence accessories such as a headlight can be located relatively closely to the axis of angular movement of a front fork.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a front elevational view, partly in cross section, as viewed in the direction of the arrow III in FIG. 2; and FIG. 4 is a fragmentary side elevational view of a front wheel steering device according to another embodiment of the present invention.

DETAILED DESCRIPTION OF THE PREFERRED EMBODIMENT

Figure 1:
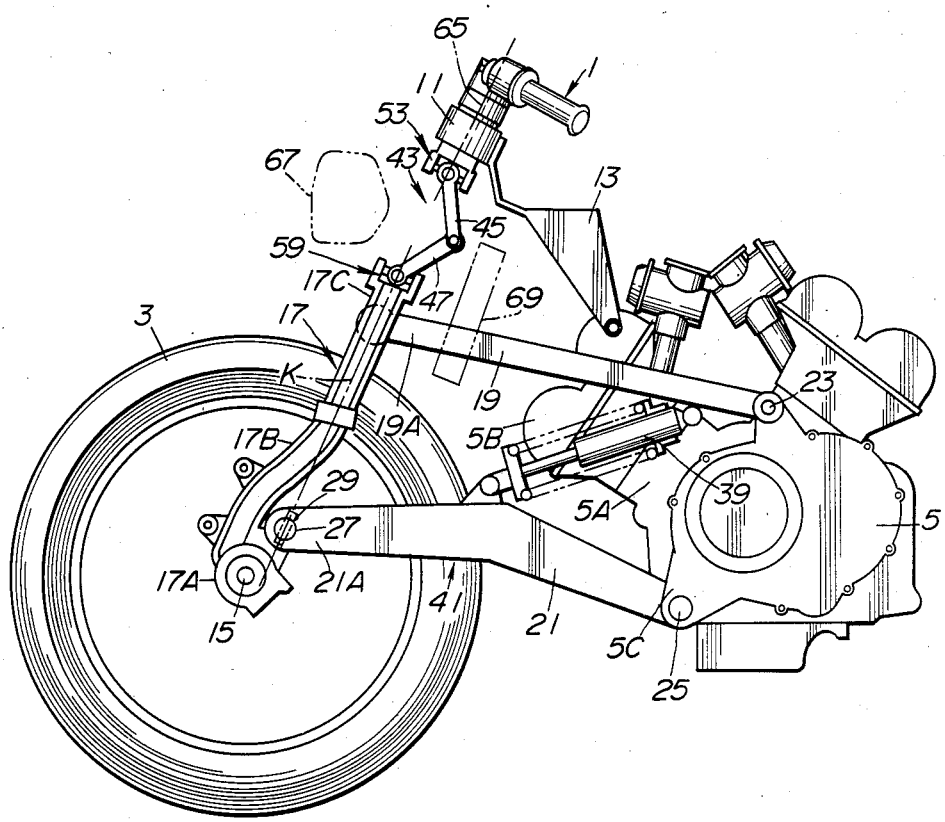
FIG. 1 is a schematic side elevational view of a front portion of a motor vehicle having a front wheel steering device according to the present invention.

Like or corresponding parts are designated by like or corresponding reference characters throughout several views.

Figure 2:
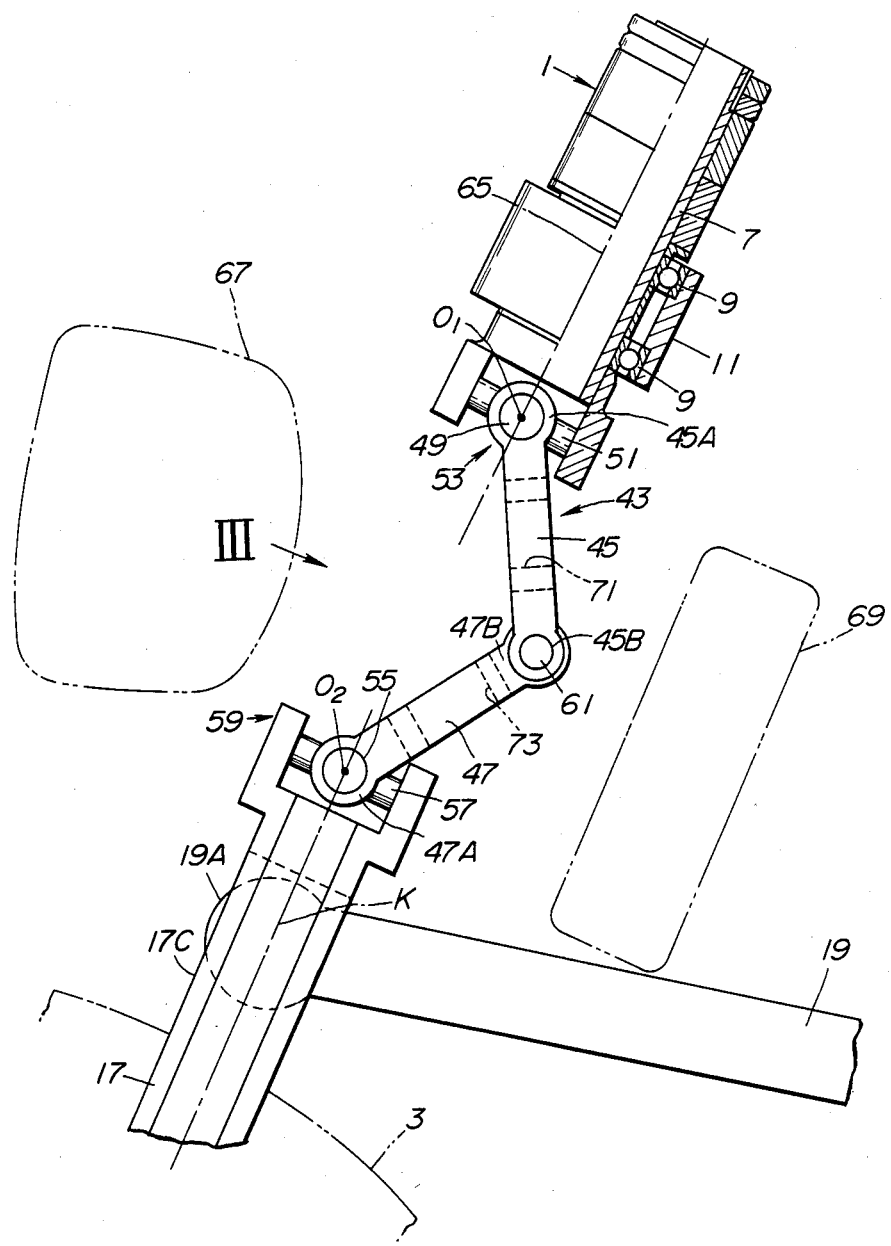
FIG. 2 is an enlarged fragmentary side elevational view, partly in cross section, of a steering link mechanism of the front wheel steering device shown in FIG. 1.

As shown in FIGS. 1 and 2, a motor vehicle, which is shown here as a motorcycle, has a steering handle 1 connected to a steering stem 7 rotatably supported in a handle post 11 by a bearing 9. The handle post 11 is supported on a stay 13 attached to a head cover 5B of a front cylinder 5A of an engine 5, which substantially serves as a motor vehicle body.

A front wheel 3 is steerably supported by a knuckle 17 on one end of an axle 15. The knuckle 17 has a lower end portion 17A supporting the axle 15 of the front wheel 3 in a cantilevered fashion, an extension 17B extending upwardly from the lower end portion 17A, and an upper end portion 17C directed transversely over the front wheel 3. The upper and lower end portions 17A, 17C of the knuckle 17 are supported on the front ends of upper and lower swing arms 19, 21 extending forwardly from an engine case 5C.

As shown in FIG. 1, the lower swing arm 21 has a rear end pivotally coupled by a shaft 25 to the engine case 5C at its lower portion, and a front end 21A on which the lower end portion 17A of the knuckle 17 is mounted for angular movement about two mutually perpendicular shafts 27, 29. As shown in FIG. 1, the upper swing arm 19 has a rear end pivotally coupled by a shaft 23 to the engine case 5C at its upper portion. The upper swing arm 19 also has a bifurcated front end 19A on which the upper end portion 17C of the knuckle 17 is mounted by bearings 35, 37 for angular movement about two mutually perpendicular shafts 31, 33.

As illustrated in FIG. 1, a damper 39 has a rear end coupled to one side of the engine 5 and a front end coupled to an intermediate portion of the lower swing arm 21. The upper and lower swing arms 19, 21 with their rear ends pivotally joined to the engine case 5C and the knuckle 17 jointly constitute a link mechanism 41. The shafts 33, 29 on the front ends 19A, 21A of the upper and lower swing arms 19, 21 extend on and along an axis K about which the knuckle 17 is angularly movable for steering the front wheel 3. The axis K is positioned on a longitudinal central line of the motor vehicle.

The steering handle 11 and the knuckle 17 are interconnected by a steering link mechanism 43. As shown in FIGS. 2 and 3, the steering link mechanism 43 comprises an upper link 45 coupled to the steering stem 7 and a lower link 47 coupled to the knuckle 17. The upper link 45 has an upper end 45A coupled to the lower end of the steering stem 7 by a first universal joint 53 having two mutually perpendicular shafts 49, 51. The lower link 47 has a lower end 47A coupled to the upper end of the knuckle 17 by a second universal joint 59 having two mutually perpendicular shafts 55, 57. The shafts 49, 55 extend transversely of the motor vehicle body, whereas the shafts 51, 57 extend longitudinally of the motor vehicle body. The transverse shafts 49, 55 and the longitudinal shafts 51, 57 intersect at central points $O_1$, $O_2$, respectively. The upper link 45 has a lower end 45B and the lower link 47 has an upper end 47B. These lower and upper ends 45B, 47B are pivotally coupled to each other by a shaft 61 positioned behind a straight line interconnecting the central points $O_1$, $O_2$ of the first and second universal joints 53, 59. Variations in the distance between the central points $O_1$, $O_2$ during vertical movement of the front wheel 3 with respect to the motor vehicle body are absorbed by swinging movement of the upper and lower links 45, 47 as they extend or collapse.

As shown in FIG. 3, the upper end 47B of the lower link 47 is rotatably supported on the shaft 61 by means of bearings 63. The upper end 45A of the upper link 45 is rotatably supported on the shaft 49 by means of bearings 101. The lower end 47A of the lower link 47 is rotatably supported on the shaft 55 by means of bearings 103. A fender 105 is positioned over the front wheel 3 below the front end 19A of the upper swing arm 19.

The steering stem 7 has a central axis 65. The central axis 65, the central points $O_1$, $O_2$, and the steering axis K lie on a straight line when viewed from the front of the motor vehicle, as shown in FIG. 3. The central point $O_2$ of the second universal joint 59 is positioned on the steering shaft K when viewed laterally of the motor vehicle, as shown in FIG. 2.

A headlight 67 and a radiator 69, indicated by the imaginary lines, are disposed in front of and behind, respectively, the upper and lower links 45, 47. As shown in FIG. 3, the upper and lower links 45, 47 have windows or openings 71, 73 to allow air to flow therethrough against the radiator 69, so that the radiator 69 can be well cooled while the motor vehicle is running.

When the front wheel 3 is being steered, the second universal joint 59, the lower link 47, and the upper link 45 move along a path of a relatively small radius. Therefore, accessories such as the headlight 67, the radiator 69, etc. can be located closely to the steering link mechanism 43.

In the illustrated embodiment, the upper and lower links 45, 47 are pivotally coupled together behind the line which joins the central points $O_1$, $O_2$ of the first and second universal joints 53, 59. This layout permits the headlight 67 to be positioned closely to the motor vehicle body, and hence the mass of the motorcycle is prevented from being widely spread.

FIG. 4 shows a front wheel steering device according to another embodiment of the present invention. In FIG. 4, a steering link mechanism 91 includes an intermediate link 85 coupled between upper and lower links 81, 83 which are connected to the steering stem 7 and the knuckle 17, respectively. More specifically, the intermediate link 85 has upper and lower ends pivotally joined to the lower and upper ends, respectively, of the upper and lower links 81, 83 by means of respective shafts 87, 89.

The upper link 81 extends at an angle with $\theta_1$ with respect to the central axis 65 of the steering stem 7, and the lower link 83 extends at an angle $\theta_2$ with respect to the steering axis K. According to the embodiment of FIG. 4, these angles $\theta_1$, $\theta_2$ are larger than the corresponding angles of the preceding embodiment. With this construction, the steering link mechanism 91 can follow or absorb vertical movement of the front wheel 3 more effectively and smoothly.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A front wheel steering device for a motor vehicle, comprising:
    a motor vehicle body;
    a steering handle angularly movably mounted on said motor vehicle body;
    a front wheel supporting member;
    a single front wheel rotatably supported by said front wheel supporting member;
    an arm means extending forwardly from said motor vehicle body and supporting said front wheel supporting members on said motor vehicle body; and
    a link assembly by which said steering handle and said front wheel supporting member are angularly movably interconnected, said link assembly including a first joint operatively coupled to said steering handle and a second joint operatively coupled to said front wheel supporting member;
    said front wheel supporting member having an axis about which it is angularly movable, an extension of said axis extending through a center of said second joint;
    said link assembly comprises an upper link having one end coupled by said first joint to said steering handle and a lower link having one end coupled by said second joint to said front wheel supporting member;
    said upper and lower links having opposite ends which are pivotally coupled to each other by means of a single shaft; and
    said front wheel supporting member comprising a knuckle having a lower end portion supporting an axle of the front wheel in a cantilevered fashion, an extension extending upwardly from the lower end portion, and an upper end portion directed transversely over the front wheel.

2. A front wheel steering device according to claim 1, wherein said opposite ends of said upper and lower links are coupled to each other for relative angular movement in a position that is closer to said motor vehicle body than a line interconnecting centers of said first and second joints.

3. A front wheel steering device according to claim 1, wherein said link assembly further includes an intermediate link having opposite ends pivotally coupled respectively to said opposite ends of said upper and lower links.

4. A front wheel steering device according to claim 1, wherein said front wheel supporting member has upper and lower ends, said arm means comprising a pair of upper and lower arms having front ends coupled respectively to said upper and lower ends of said front wheel supporting member, each of said front ends of said upper and lower arms being angularly movable with respect to said front wheel supporting member about two mutually perpendicular shafts.

5. A front wheel steering device according to claim 1, wherein said first and second joints comprise first and second universal joints, respectively.

6. A motor vehicle and a front wheel steering device for the motor vehicle, comprising:
   a motor vehicle body;
   a steering handle angularly movably mounted on said motor vehicle body;
   a front wheel supporting member;
   a single front wheel rotatably supported by said front wheel supporting member;
   an arm means extending forwardly from said motor vehicle body and supporting said front wheel supporting member on said motor vehicle body; and
   a link assembly by which said steering handle and said front wheel supporting member are angularly movably interconnected, said link assembly including a first joint operatively coupled to said steering handle and a second joint operatively coupled to said front wheel supporting member;
   said front wheel supporting member having an axis about which it is angularly movable, an extension of said axis extending through a center of said second joint;
   said link assembly comprises an upper link having one end coupled by said first joint to said steering handle and a lower link having one end coupled by said second joint to said front wheel supporting member;
   said upper and lower links having opposite ends which are pivotally coupled to each other by means of a single shaft; and
   said front wheel supporting member comprising an knuckle having a lower end portion supporting an axle of the front wheel in a cantilevered fashion, an extension extending upwardly from the lower end portion, and an upper end portion directed transversely over the front wheel;
   said link assembly having at least one window to allow air to flow therethrough while the motor vehicle is travelling.

7. A front wheel steering device according to claim 6, wherein said motor vehicle further includes a radiator disposed behind said link assembly.

8. A front wheel steering device according to claim 6, wherein said link assembly further includes an intermediate link having opposite ends pivotally coupled respectively to said opposite ends of said upper and lower links.

9. A front wheel steering device according to claim 6, wherein said front wheel supporting member has upper and lower ends, said arm means comprising a pair of upper and lower arms having front ends coupled respectively to said upper and lower ends of said front wheel supporting member, each of said front ends of said upper and lower arms being angularly movable with respect to said front wheel supporting member about two mutually perpendicular shafts.

10. A front wheel steering device according to claim 6, wherein said first and second joints comprise first and second universal joints, respectively.

* * * * *

UNITED STATES PATENT AND TRADEMARK OFFICE
CERTIFICATE OF CORRECTION

PATENT NO. : 4,741,545

DATED : May 3, 1988

INVENTOR(S) : Kenji HONMA et al

It is certified that error appears in the above-identified patent and that said Letters Patent is hereby corrected as shown below:

Column 1, line 28, change "th" to --the--.

Column 4, line 1, after "angle" delete "with"
line 31, (claim 1, line 11) change "members" to --member--.

Column 6, line 6, (claim 6, line 30), change "an" to --a--.

In the Abstract, line 6, change "movable" to --movably--.

Signed and Sealed this

Eleventh Day of October, 1988

Attest:

DONALD J. QUIGG

*Attesting Officer*  *Commissioner of Patents and Trademarks*